United States Patent
Lebzelter et al.

(10) Patent No.: US 8,231,989 B2
(45) Date of Patent: Jul. 31, 2012

(54) METHOD FOR IMPROVING FCS RELIABILITY AFTER END CELL HEATER FAILURE

(75) Inventors: Derek R Lebzelter, Rochester, NY (US); William S Marley, Rush, NY (US); John P. Salvador, Penfield, NY (US); Abdullah B. Alp, West Henrietta, NY (US); Loren Devries, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1313 days.

(21) Appl. No.: 11/925,422

(22) Filed: Oct. 26, 2007

(65) Prior Publication Data

US 2009/0110966 A1    Apr. 30, 2009

(51) Int. Cl.
*H01M 8/04* (2006.01)
(52) U.S. Cl. ............ 429/13; 429/429; 429/433
(58) Field of Classification Search .......... None
See application file for complete search history.

(56) References Cited

U.S. PATENT DOCUMENTS

| 7,241,523 B1* | 7/2007 | Arikara et al. ............ 429/410 |
| 2005/0037253 A1* | 2/2005 | Faghri .................... 429/34 |
| 2005/0058865 A1* | 3/2005 | Thompson et al. ........ 429/26 |
| 2006/0240298 A1* | 10/2006 | Yamada et al. ........... 429/24 |
| 2008/0124596 A1* | 5/2008 | Kolodziej et al. ........ 429/24 |

* cited by examiner

*Primary Examiner* — Ula C. Ruddock
*Assistant Examiner* — Alix Echelmeyer
(74) *Attorney, Agent, or Firm* — John A. Miller; Miller IP Group, PLC

(57) ABSTRACT

A method for improving fuel cell system reliability in the event of end cell heater failure in a fuel cell stack. The method includes detecting that an end cell heater has failed. If an end cell heater failure is detected, then the method performs one or more of setting a cooling fluid pump to a predetermined speed that drives a cooling fluid through cooling fluid flow channels in the fuel cell stack, limiting the output power of the fuel cell stack or the net power of the fuel cell system, limiting the maximum temperature of the cooling fluid flowing out of the stack, turning off stack anti-flooding algorithms that may be used to remove water from reactant gas flow channels in the stack, and turning off cathode stoichiometry adjustments for relative humidity control in response to water accumulating in cathode flow channels in the fuel cell stack.

22 Claims, 2 Drawing Sheets

METHOD FOR IMPROVING FCS RELIABILITY AFTER END CELL HEATER FAILURE

BACKGROUND OF THE INVENTION

1. Field of the Invention

This invention relates generally to a system and method for improving the reliability of a fuel cell system and, more particularly, to a system and method for taking preventative measures in response to end cell heater failure in a fuel cell stack to minimize stack degradation and/or prevent stack failure until such time that repair is possible.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have a certain relative humidity so that the ionic resistance across the membrane is low enough to effectively conduct protons. This humidification may come from the stack water by-product or external humidification. The flow of the reactant gas through the flow channels has a drying effect on the membrane, most noticeably at an inlet of the flow channels. Also, the accumulation of water droplets within the flow channels from the membrane relative humidity and water by-product could prevent reactant gas from flowing therethrough, and cause the cell to fail, thus affecting the stack stability. The accumulation of water in the reactant gas flow channels is particularly troublesome at low stack output loads.

The end cells in a fuel cell stack typically have different performance and sensitivity to operating conditions than the other cells in the stack. Particularly, the end cells are nearest in location to the stack's ambient temperature surroundings, and thus have a temperature gradient that causes them to operate at a lower temperature as a result of various heat losses. Because the end cells are typically cooler than the rest of the cells in the stack, gaseous water more easily condenses into liquid water so that the end cells have a higher relative humidity, which causes water droplets to more readily form in the flow channels of the end cells. Further, at low stack loads, the amount of reactant gas flow available to push the water out of the flow channels is significantly reduced. Also, at low stack loads the temperature of the cooling fluid is reduced, which reduces the temperature of the stack and typically increases the relative humidity of the reactant gas flow.

It is known in the art to heat the end cells of a fuel cell stack using resistive heaters positioned between the end unit and the unipolar plate so as to compensate for heat losses. However, sometimes these end cell heaters fail where they remain on, which could result in a larger problem than a stack without end cell heaters.

SUMMARY OF THE INVENTION

In accordance with the teachings with the present invention, a system and method are disclosed for improving fuel cell system reliability in the event of end cell heater failure in a fuel cell stack. The method includes detecting that an end cell heater has failed to be in a constantly on condition. If an end cell heater failure is detected, then the method performs one or more of setting a cooling fluid pump to a predetermined speed that drives a cooling fluid through cooling fluid flow channels in the fuel cell stack, limiting the output power of the fuel cell stack, limiting the maximum temperature of the cooling fluid flowing out of the stack, turning off stack anti-flooding algorithms that may be used to remove water from reactant gas flow channels in the stack, and turning off cathode stoichiometry adjustments for relative humidity control in response to water accumulating in cathode flow channels in the fuel cell stack.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for improving fuel cell system reliability in the event of end cell heater failure is merely exemplary in nature, and is in no way intended to limit the invention or its applications or uses.

Figure 1:
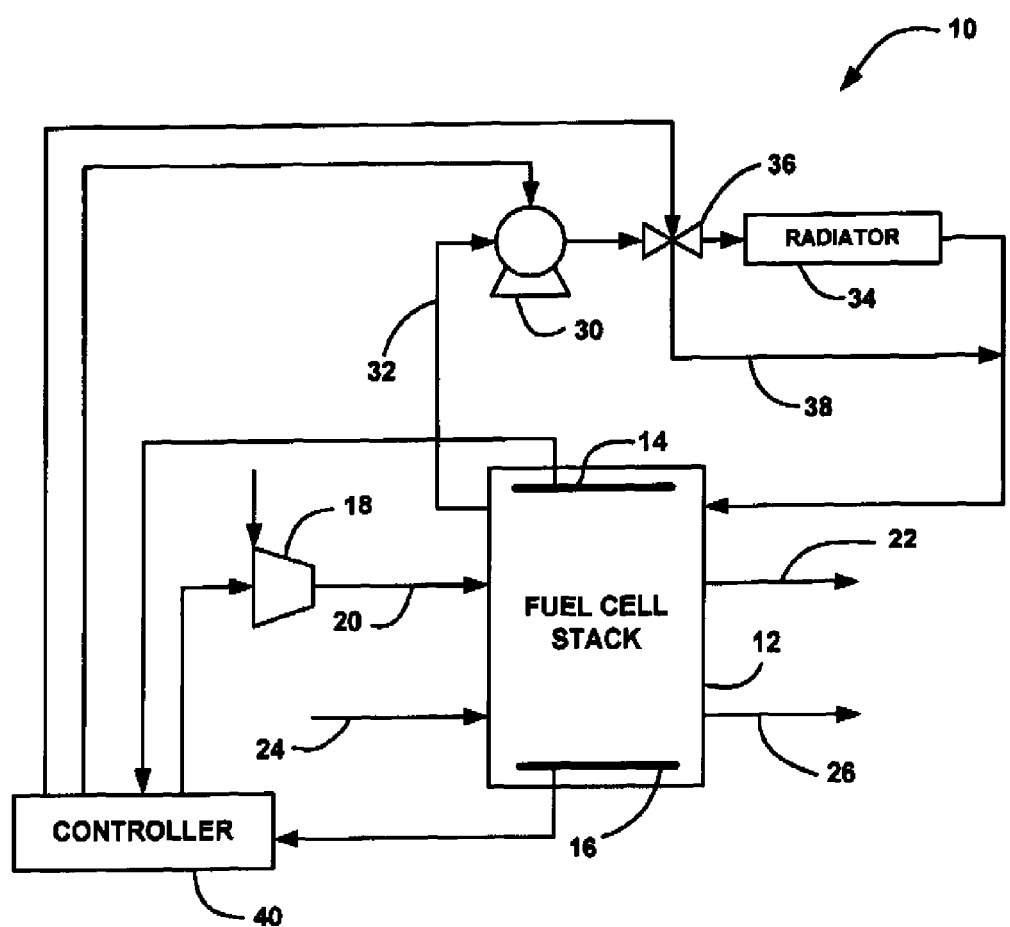
FIG. 1 is a schematic plan view of a fuel cell system.

FIG. 1 is a plan view of a fuel cell system 10 including a fuel cell stack 12. The fuel cell stack 12 includes end cell heaters 14 and 16 positioned in the end cells of the stack 12. In one non-limiting embodiment, the end cell heaters 14 and 16 are resistive heaters. The type of end cell heater, the positioning of the end cell heaters 14 and 16 and the control of the end heaters 14 and 16 during normal operation of the fuel cell system 10 are all well known parameters to those skilled in the art.

The fuel cell stack 12 receives cathode input air from a compressor 18 on cathode input line 20, and outputs cathode exhaust gas on cathode output line 22. Likewise, the fuel cell stack 12 receives a hydrogen gas flow on anode input line 24, and outputs anode exhaust gas on anode output line 26. Cooling fluid flow channels are provided in the bipolar plates in the fuel cell stack 12. A cooling fluid is pumped through the cooling fluid flow channels by a pump 30 and through a cooling fluid loop 32 outside of the stack 12. The cooling fluid in the loop 32 from the stack 12 is sent to a radiator 34 where it is reduced in temperature prior to being sent back to the fuel cell stack 12. A radiator by-pass valve 36 allows a controlled amount of the cooling fluid to go through the radiator 34 or by-pass the radiator 34 on a by-pass line 38 so as to help control the temperature of the fuel cell stack 12 in a manner that is well understood to those skilled in the art. A controller 40 receives various input signals from the system 10, including temperature measurement signals from the end cell heaters 14 and 16. The controller 40 also controls the various elements in the system 10, including the compressor 18, the pump 30 and the by-pass valve 36.

The controller 40 provides a particular pulse-width modulation (PWM) signal to the end cell heaters 14 and 16 having a particular duty cycle that identifies when the heaters 14 and 16 are on and when they are off for a particular system operation. The power that actually drives the end cell heaters 14 and 16 can be provided by the power output of the fuel cell stack 12. Because the end cell heaters 14 and 16, and related circuitry, are in a somewhat severe environment, it is possible that some part of the end cells 14 and 16 or their circuitry can fail causing the end cell heaters 14 and 16 to either be stuck on or be stuck off.

If the end cell heaters 14 and 16 are stuck continuously on, a significant amount of heat is generated by the end cell heaters 14 and 16 that could damage the fuel cell stack 12, particularly the membranes therein. It has been proposed in the art to provide certain circuitry that would cause the end cell heaters 14 and 16 to remain continuously off if a failure occurred or was detected. However, such a condition causes the problem discussed above if no end cell heaters were provided in the stack 12. With either of the end cell heaters 14 and 16 stuck in the continuous on position, the end cells of the stack 12 get hot and dry, causing poor cell performance due to high ionic resistance. This problem increases if the vehicle operator requests high power where the stack 12 produces a high current density causing end cell performance to decrease significantly. Therefore, it would be desirable to have an algorithm that took various remedial steps in response to end cell heater failure in the on position so that the fuel cell system 10 can continue to run without causing damage to the stack 12 until such a time that the fuel cell system 10 can be serviced.

Figure 2:
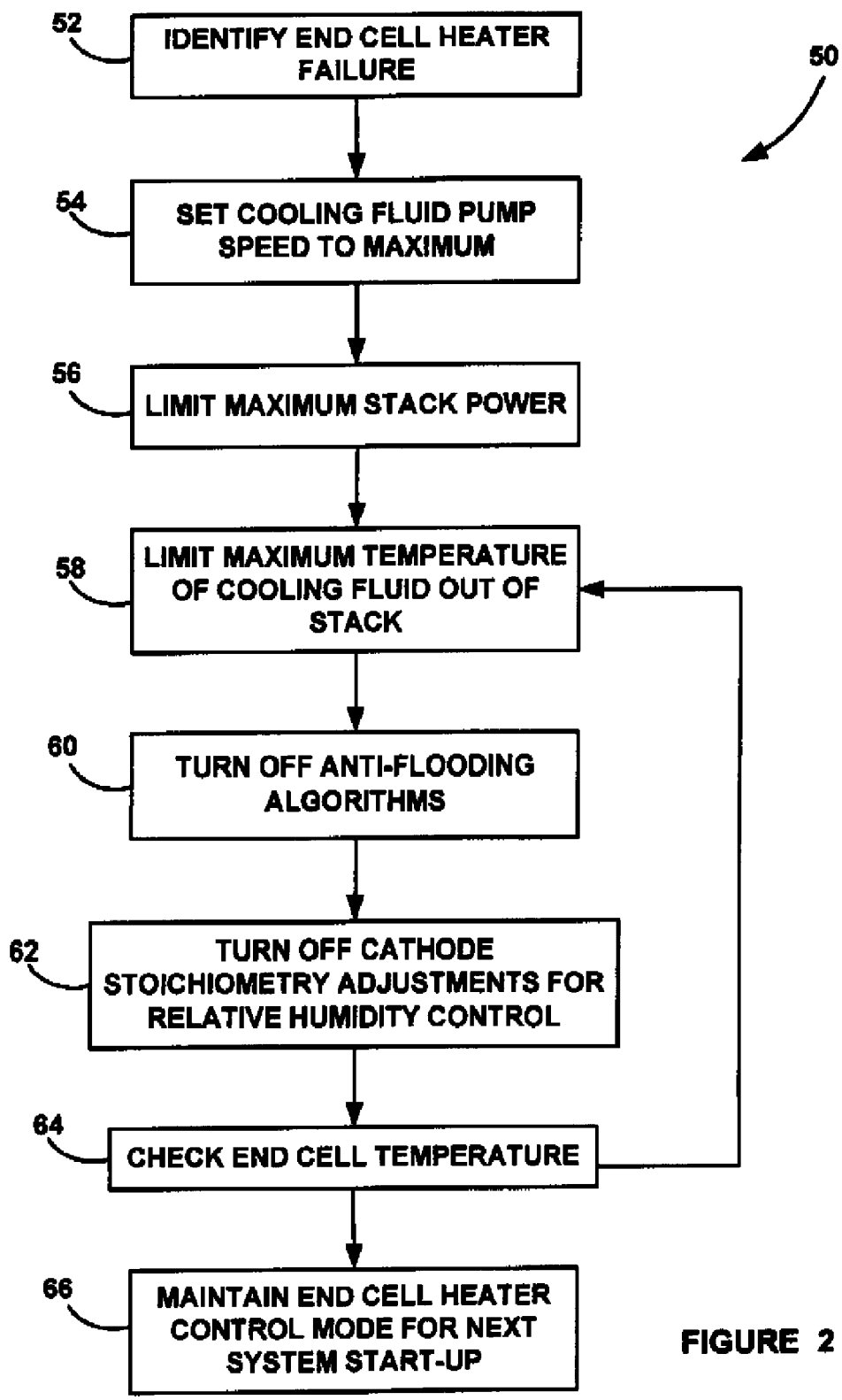
FIG. 2 is a flow chart diagram showing an operation for improving fuel cell system reliability in the event of end cell heater failure, according to an embodiment of the present invention.

FIG. 2 is a flow chart diagram 50 showing a process for mitigating or preventing fuel cell stack damage in response to end cell heater failure, according to an embodiment of the present invention. The algorithm identifies an end cell heater failure at box 52. This can be accomplished in any suitable manner, such as measuring the temperature of the end cell and the temperature of the cooling fluid flowing through the cooling fluid loop 32 to determine whether there is a significant difference between the two. Also, the current applied to the end cell heaters 14 and 16 can be measured to determine whether more current is being drawn by the end cell heaters 14 and 16 than is required for a particular duty cycle of the PWM signal. If the algorithm determines that an end cell heater has failed, it can cause a warning to be given to the vehicle operator indicative of the failure, such as turning on a service soon light.

If the algorithm determines that one or both of the end cell heaters 14 and 16 has failed continuously on, the algorithm will set the speed of the cooling fluid pump 30 to a predetermined maximum speed at box 54. By increasing the flow rate of the cooling fluid through the stack 12, the temperature rise of the fuel cells within the stack 12 is limited because more cooling fluid enters the stack 12 to draw away excess heat. Therefore, the end cells of the stack 12 would not dry out and overheat as severely with the speed of the cooling fluid pump 30 in this position.

The algorithm may also set a predetermined maximum output power from the stack 12 at box 56. In one non-limiting embodiment, the maximum stack power is set to 10 kW. If more than this maximum amount of power were allowed to be drawn from the stack 12, then more current is drawn from the end cells that are already being over-heated, which would reduce the voltage of the end cells, possibly causing them to be unstable. In other words, as the temperature of the end cell goes up, the relative humidity within the end cell goes down, causing the resistance of the cell to go up. As more current is being drawn from an end cell in this condition, more voltage losses occur causing the voltage across the end cell to go down. If this phenomenon continues, the voltage across the end cell may go negative, possibly causing end cell and/or stack failure.

Further, the algorithm may limit the maximum temperature of the cooling fluid out of the stack 12 at box 58 to be below a normal system maximum if the end cell heaters 14 and 16 were operating properly. In one non-limiting embodiment, the maximum allowable cooling fluid temperature could be about 70° C. By limiting the temperature of the cooling fluid, the temperature of the end cells in the stack 12 can be reduced to prevent chemical degradation and performance problems. The algorithm can reduce the temperature of the cooling fluid by causing more of the cooling fluid to flow through the radiator 34 as opposed to by-passing the radiator 34 on the by-pass line 38. Particularly, the controller 40 controls the by-pass valve 36 to reduce or eliminate the amount of cooling fluid that flows through the by-pass line 38 so that the temperature of the cooling fluid is further reduced.

The algorithm also can turn off anti-flooding algorithms at box 60 that may be changing system parameters in a predetermined manner to control the amount of water accumulation in the various reactant gas flow channels in the bipolar plates in the stack 12. Algorithms for this purpose are well known to those skilled in the art. Because the end cells would be at a higher temperature if the end cell heaters 14 and 16 were continuously on, the amount of water within the cathode or anode flow channels would be reduced from normal end cell heater operation. Therefore, it may be desirable to turn off the algorithms that act to limit the amount of water in the flow channels because the fuel cell system may appear to be operating properly, i.e., the end cell heaters are operating properly, from the anti-flooding algorithm's point of view.

The algorithm also can turn off cathode stoichiometry adjustments for stack relative humidity control at box 62. The cathode stoichiometry, i.e., the relationship between the cathode input airflow and the stack output current, has a particular set-point for each stack current density. Cathode stoichiometry control is typically employed during power transients where the relative humidity control in the cathode flow channels is affected by the water production rate, i.e., current, of the stack 12 and the flow of cathode input air to the stack 12. For those times when the system may want to increase the cathode stoichiometry to reduce the cathode flow channel water accumulation, it may be desirable to stop the operation of this algorithm because the end cells are already hot from the failed end cell heater, which reduces their ability to accumulate water. By increasing the speed of the compressor 18 to increase the cathode stoichiometry, more drying air is forced through the reactant gas flow channels, which could even further dry out an already heated and dry cell.

The algorithm may also periodically check the temperature of the end cell heaters 14 and 16 at box 64. Even with all of the other previous steps of the algorithm, the end cell heater temperature could still be too high to prevent performance loss and increased cell degradation. Appropriate action in this case could include, but not be limited to, further reducing the temperature of the cooling or system shut-down. Therefore, the algorithm may return to the step of the box 58 to further reduce the temperature of the cooling to an even lower value.

The algorithm can also maintain the end cell heater control mode for the next system start-up at box 66. After the algorithm has determined that there is an end cell heater failure where the end cell heater is stuck in the on position, and has taken one or more of the measures discussed above to reduce stack degradation, it may be desirable to maintain the end cell heater failure control mode after the vehicle has been shut-down and restarted. By maintaining the end cell heater failure control mode for the next start-up, the system will not have to go through the process of again determining that the end cell heater 14 and/or 16 has failed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for taking remedial action in response to failure of an end cell heater in a fuel cell stack, said method comprising:
    identifying that the end cell heater has failed in a continuously on condition such that it remains continuously on;
    setting a cooling fluid pump to a predetermined maximum speed that drives a cooling fluid through cooling fluid flow channels in the fuel cell stack;
    limiting the maximum output power of the fuel cell stack;
    limiting the maximum temperature of the cooling fluid flowing through the stack;
    turning off anti-flooding processes that may be used to reduce water accumulation in reactant gas flow channels in the stack; and
    turning off cathode stoichiometry adjustments for relative humidity control from water accumulating in cathode flow channels in the fuel cell stack.

2. The method according to claim 1 wherein identifying an end cell heater failure includes measuring the temperature of the end cell and the temperature of the cooling fluid flowing through a cooling fluid loop to determine whether there is a significant difference between the two.

3. The method according to claim 1 wherein identifying an end cell heater failure includes determining whether more current is being drawn by the end cell heater than is required for a particular duty cycle of a pulse-width modulated signal controlling the end cell heater.

4. The method according to claim 1 further comprising maintaining the end cell heater failure mode from a system shut-down to the next system start-up.

5. The method according to claim 1 wherein limiting the maximum temperature of the cooling fluid includes reducing or eliminating the amount of cooling fluid that by-passes a radiator outside of the stack.

6. The method according to claim 1 further comprising determining the temperature of the end cells and wherein limiting the maximum temperature of the cooling fluid includes further limiting the temperature of the cooling fluid if the temperature of the end cells is determined to be too high.

7. The method according to claim 1 wherein the heaters are resistive heaters.

8. A method for taking remedial action in response to failure of an end cell heater in a fuel cell stack, said method comprising:
    identifying that the end cell heater has failed in a continuously on condition such that it remains continuously on;
    setting a cooling fluid pump to a predetermined maximum speed that drives a cooling fluid through cooling fluid flow channels in the fuel cell stack; and
    limiting the maximum output power of the fuel cell stack.

9. The method according to claim 8 further comprising limiting the maximum temperature of the cooling fluid flowing through the stack.

10. The method according to claim 9 wherein limiting the maximum temperature of the cooling fluid includes reducing or eliminating the amount of cooling fluid that by-passes a radiator outside of the stack.

11. The method according to claim 8 further comprising turning off anti-flooding processes that may be used to reduce water accumulation in reactant gas flow channels in the stack.

12. The method according to claim 8 further comprising turning off cathode stoichiometry adjustments for relative humidity control from water accumulating in cathode flow channels in the fuel cell stack.

13. The method according to claim 8 wherein identifying an end cell heater failure includes measuring the temperature of the end cell and the temperature of the cooling fluid flowing through a cooling fluid loop to determine whether there is a significant difference between the two.

14. The method according to claim 8 wherein identifying an end cell heater failure includes determining whether more current is being drawn by the end cell heater than is required for a particular duty cycle of a pulse-width modulated signal controlling the end cell heater.

15. The method according to claim 8 further comprising maintaining the end cell heater failure mode from a system shut-down to the next system start-up.

16. A method for taking remedial action in response to failure of an end cell heater in a fuel cell stack, said method comprising:
    identifying that the end cell heater has failed in a continuously on condition such that it remains continuously on;
    setting a cooling fluid pump to a predetermined maximum speed that drives a cooling fluid through cooling fluid flow channels in the fuel cell stack;
    limiting the maximum output power of the fuel cell stack; and turning off anti-flooding processes that may be used to reduce water accumulation in reactant gas flow channels in the stack.

17. The method according to claim 16 further comprising limiting the maximum temperature of the cooling fluid flowing through the stack.

18. The method according to claim 17 wherein limiting the maximum temperature of the cooling fluid includes reducing or eliminating the amount of cooling fluid that by-passes a radiator outside of the stack.

19. The method according to claim 16 further comprising turning off cathode stoichiometry adjustments for relative humidity control from water accumulating in cathode flow channels in the fuel cell stack.

20. The method according to claim 16 wherein identifying an end cell heater failure includes measuring the temperature of the end cell and the temperature of the cooling fluid flowing through a cooling fluid loop to determine whether there is a significant difference between the two.

21. The method according to claim 16 wherein identifying an end cell heater failure includes determining whether more current is being drawn by the end cell heater than is required for a particular duty cycle of a pulse-width modulation signal controlling the end cell heater.

22. The method according to claim 16 further comprising maintaining the end cell heater failure mode from a system shut-down to the next system start-up.

* * * * *